C. NEEDHAM.
CASTING CAR WHEELS.
No. 110,779.  Patented Jan. 3, 1871.
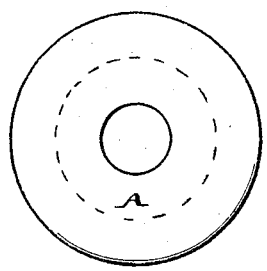
Fig. 2
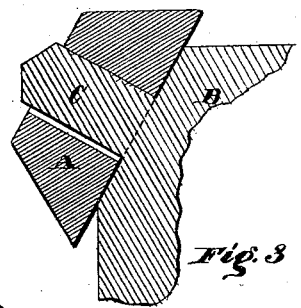
Fig. 3
Fig. 1
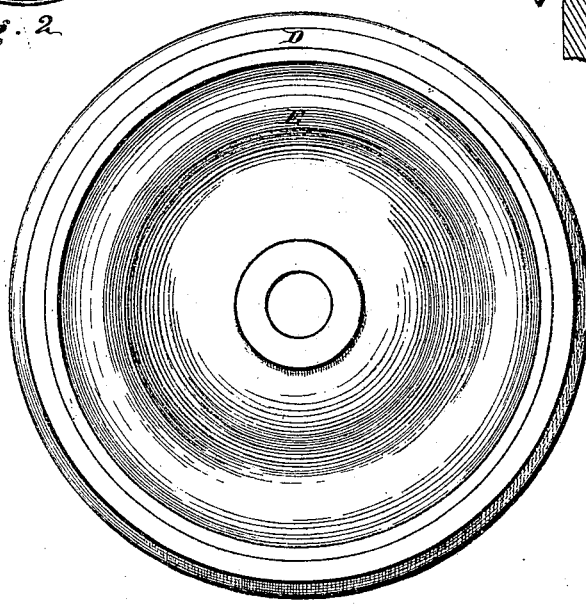
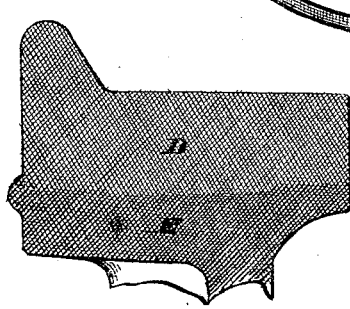
Fig. 4
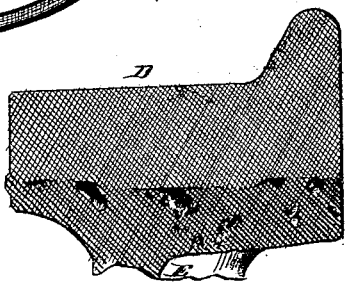
Fig. 5
Witnesses
Thos. H. Dodge
Geo. H. Miller
Inventor
Chandler Needham

United States Patent Office.

CHANDLER NEEDHAM, OF WORCESTER, MASSACHUSETTS.

Letters Patent No. 110,779, dated January 3, 1871.

IMPROVEMENT IN CASTING CAR-WHEELS.

The Schedule referred to in these Letters Patent and making part of the same.

*To all whom it may concern:*

Be it known that I, CHANDLER NEEDHAM, of the city and county of Worcester and Commonwealth of Massachusetts, have made certain new and useful Improvements in Wheels for Railroad-Cars; and I do hereby declare the following to be a full, clear, and exact description of the same, reference being had to the accompanying drawing forming part of this specification, in which—

Figure 1 represents a view of the outer side of my improved car-wheel;

Figure 2 represents a view of the ingot from which the tire or reinforce is made;

Figure 3 represents a central section of the ingot and forming-anvil.

Figure 4 represents, upon a larger scale, a transverse section of the rim of my improved wheel.

Figure 5 represents a similar section of the rim of a wheel as heretofore constructed by the use of a welding-flux, and upon which mine is an improvement.

To enable those skilled in the art to which my invention belongs to make and use the same, I will proceed to describe it more in detail.

My invention relates to the mode of constructing metallic car-wheels, as hereinafter more fully explained.

My improved wheel for railroad-cars is made as follows:

A suitable quantity of cast-steel to form the reinforce or tire of the wheel is cast into an annular ingot, A, (see fig. 2,) about fifteen inches in diameter, with an opening at its center about four inches in diameter.

This ingot A is thoroughly hammered by means of a steam-hammer upon an anvil, B, which is provided with a suitable horn, C, to set into the opening at the center of the ingot, so that it can be hammered around all sides.

After its diameter has been extended, by means of the hammer, to about eighteen inches, it is subjected to the action of forming rolls, which enlarge it to the proper size and shape to form the tire D of the wheel.

The tire D is then placed in a heating-furnace and heated to a bright cherry-red, when it is taken from the furnace, and any adhering foreign substance removed from its inner surface, after which it is placed within the mold, in which the body E of the wheel is to be cast, said mold having been previously formed and prepared for its reception.

After the heated tire D has been properly adjusted within the mold, the flask is closed, and the molten-iron is immediately poured in, which, as it comes in contact with the highly-heated steel, fuses the surface of the latter, thereby forming a perfect union between the two, and, as the metal cools, the body E and tire D are welded into one solid mass.

The molten-iron is introduced to the mold through a series of openings at the rim of the wheel, so that it enters just at the inside of the tire D, and from thence flows to the center, whereby all dirt and dust are carried away from the tire D, which might otherwise be carried against the surface of the steel, and thereby prevent the perfect welding of the parts.

The molten iron, entering the mold at the rim of the wheel, also keeps the tire D in a highly-heated state until the mold is filled, thus tending to insure greater cohesion of the steel and iron.

The body of the wheel, instead of being formed as shown, may be made with spokes when desired.

By reference to fig. 5 of the drawing, which represents a section of a wheel as heretofore constructed, according to the process patented to Zadoc Washburn, November 30, 1869, it will be observed that the cast-iron, instead of lying still and forming a perfect weld or union with the steel, is agitated and caused to bubble by the gas generated by the molten iron as it comes in contact with the flux used in said Washburn's process, whereby the perfect and desired union of the iron and steel is prevented, and, consequently, an imperfect and defective wheel is produced, the cast-iron being more or less filled with bubble-holes, while no suitable union is effected with the steel.

Having described my improved railroad-car wheel, I hereby disclaim the invention for which Letters Patent were granted to Zadoc Washburn, November 30, 1869; but What I do claim therein as new and of my invention, and desire to secure by Letters Patent, is—

The process or mode above described, for making a combined cast-steel and cast-iron car-wheel, whereby the molten cast-iron is introduced through a series of holes into the mold directly upon the inner unfluxed surface of the cast-steel tire, and a perfect union and weld of the metals are produced, as stated.

CHANDLER NEEDHAM.

Witnesses:
THOS. H. DODGE,
GEO. H. MILLER.